US011164065B2

(12) United States Patent
Cronin et al.

(10) Patent No.: US 11,164,065 B2
(45) Date of Patent: Nov. 2, 2021

(54) IDEATION VIRTUAL ASSISTANT TOOLS

(71) Applicant: Bright Marbles, Inc., Menlo Park, CA (US)

(72) Inventors: John Cronin, Jericho, VT (US); Burt Cummings, Menlo Park, CA (US); Charles Root, Underhill, VT (US); Michael D'Andrea, Burlington, VT (US); Jeffrey Goodwin, Montpelier, VT (US)

(73) Assignee: Bright Marbles, Inc., Menlo Park, CA (US)

( * ) Notice: Subject to any disclaimer, the term of this patent is extended or adjusted under 35 U.S.C. 154(b) by 87 days.

(21) Appl. No.: 16/551,509

(22) Filed: Aug. 26, 2019

(65) Prior Publication Data

US 2020/0167630 A1     May 28, 2020

Related U.S. Application Data

(60) Provisional application No. 62/722,622, filed on Aug. 24, 2018, provisional application No. 62/722,628, (Continued)

(51) Int. Cl.
*G06F 16/23* (2019.01)
*G06F 16/245* (2019.01)
(Continued)

(52) U.S. Cl.
CPC ............ *G06N 3/004* (2013.01); *G06F 3/167* (2013.01); *G06F 9/453* (2018.02);
(Continued)

(58) Field of Classification Search
CPC .......... G06F 16/24; G06F 16/63; G06Q 10/10; G06N 3/004
See application file for complete search history.

(56) References Cited

U.S. PATENT DOCUMENTS

| 5,059,528 A | 10/1991 | Bollen et al. |
| 5,814,467 A | 9/1998 | Curtiss et al. |

(Continued)

FOREIGN PATENT DOCUMENTS

KR     2018-0019869     2/2018

OTHER PUBLICATIONS

U.S. Appl. No. 16/550,992, John Cronin, Intelligence-Driven Virtual Assistant for Automated Idea Documentation, filed Aug. 26, 2019.

(Continued)

*Primary Examiner* — Charles E Lu
(74) *Attorney, Agent, or Firm* — Polsinelli LLP

(57) ABSTRACT

An intelligence-driven virtual assistant for automated documentation of new ideas is provided. During a brainstorming session, one or more user participants may discuss and identify one or more ideas. Such ideas may be tracked, catalogued, analyzed, developed, and further expanded upon through use of an intelligence-driven virtual assistant. Such virtual assistant may capture user input data embodying one or more new ideas and intelligently process the same in accordance with creativity tool workflows. Such workflows may further guide development and expansion upon a given idea, while continuing to challenge ideas, provide opportunities to collaborate, and optimize scheduling of ideation sessions for efficiency, while continuing to document, analyze, and identify further aspects to develop and expand.

17 Claims, 12 Drawing Sheets

Related U.S. Application Data filed on Aug. 24, 2018, provisional application No. 62/722,632, filed on Aug. 24, 2018.

(51) Int. Cl.

| | |
|---|---|
| *G06F 16/248* | (2019.01) |
| *G06F 16/63* | (2019.01) |
| *G06F 16/24* | (2019.01) |
| *G06N 3/00* | (2006.01) |
| *G06F 9/451* | (2018.01) |
| *G06F 3/16* | (2006.01) |
| *G06N 20/00* | (2019.01) |

(52) U.S. Cl.
CPC .......... *G06F 16/2379* (2019.01); *G06F 16/24* (2019.01); *G06F 16/245* (2019.01); *G06F 16/248* (2019.01); *G06F 16/63* (2019.01); *G06N 20/00* (2019.01)

(56) References Cited

U.S. PATENT DOCUMENTS

| | | | |
|---|---|---|---|
| 6,266,635 B1 | 7/2001 | Sneh | |
| 6,934,905 B1 | 8/2005 | Tighe | |
| 7,493,253 B1 | 2/2009 | Ceusters et al. | |
| 7,711,547 B2 | 5/2010 | Abir | |
| 7,996,440 B2 | 8/2011 | Probst et al. | |
| 8,131,557 B2 | 3/2012 | Davis et al. | |
| 9,047,857 B1 | 6/2015 | Barton | |
| 9,111,214 B1 | 8/2015 | Sharma et al. | |
| 9,904,675 B2 | 2/2018 | Kantor et al. | |
| 9,912,769 B2 | 3/2018 | Gong et al. | |
| 10,013,980 B2 | 7/2018 | Borsutsky et al. | |
| 10,834,145 B2 * | 11/2020 | Buddenbaum | H04L 65/1093 |
| 11,081,113 B2 | 8/2021 | Cronin | |
| 2001/0034629 A1 | 10/2001 | Cronin | |
| 2004/0189702 A1 | 9/2004 | Hlavac et al. | |
| 2005/0182773 A1 * | 8/2005 | Feinsmith | G06Q 10/10 |
| 2006/0036452 A1 | 2/2006 | Williams | |
| 2006/0036529 A1 | 2/2006 | Williams | |
| 2006/0036632 A1 | 2/2006 | Williams | |
| 2006/0036635 A1 | 2/2006 | Williams | |
| 2008/0046394 A1 | 2/2008 | Zhou et al. | |
| 2010/0174760 A1 * | 7/2010 | Longobardi | G06Q 10/109 |
| | | | 707/807 |
| 2012/0166414 A1 | 6/2012 | Decker et al. | |
| 2012/0233037 A1 * | 9/2012 | Lamoureux | G06Q 50/04 |
| | | | 705/27.2 |
| 2013/0117018 A1 * | 5/2013 | O'Sullivan | G10L 15/26 |
| | | | 704/235 |
| 2014/0122056 A1 | 5/2014 | Duan | |
| 2014/0122083 A1 | 5/2014 | Xiaojiang | |
| 2015/0007055 A1 * | 1/2015 | Lemus | G06F 3/0354 |
| | | | 715/753 |
| 2015/0020002 A1 * | 1/2015 | McKenzie | G06F 3/0482 |
| | | | 715/753 |
| 2015/0271218 A1 * | 9/2015 | Steingrimsson | G06Q 10/101 |
| | | | 709/204 |
| 2016/0021557 A1 | 1/2016 | Tabet et al. | |
| 2016/0044073 A1 | 2/2016 | Rosenberg | |
| 2017/0235848 A1 | 8/2017 | Van Dusen et al. | |
| 2017/0310613 A1 | 10/2017 | Lalji et al. | |
| 2018/0018564 A1 | 1/2018 | Erenrich et al. | |
| 2018/0032576 A1 | 2/2018 | Romero | |
| 2018/0131645 A1 | 5/2018 | Magliozzi et al. | |
| 2018/0174103 A1 * | 6/2018 | Auger | G06Q 10/10 |
| 2018/0191596 A1 | 7/2018 | Bhaya et al. | |
| 2018/0218285 A1 | 8/2018 | Oliner et al. | |
| 2018/0357032 A1 * | 12/2018 | Popovich | G06F 3/0488 |
| 2019/0052701 A1 | 2/2019 | Rathod | |
| 2019/0079996 A1 * | 3/2019 | Mochel | G06F 16/248 |
| 2019/0279619 A1 * | 9/2019 | Krasadakis | G06F 16/683 |
| 2020/0065924 A1 | 2/2020 | Cronin | |
| 2020/0066259 A1 | 2/2020 | Cronin | |
| 2020/0066277 A1 | 2/2020 | Cronin | |

OTHER PUBLICATIONS

PCT/US19/48115, Intelligence-Driven Virtual Assistant for Automated Idea Documentation, Aug. 26, 2019.
U.S. Appl. No. 16/551,365, John Cronin, Idea Assessment and Landscape Mapping, filed Aug. 26, 2019.
PCT/US19/48158, Idea Assessment and Landscape Mapping, Aug. 26, 2019.
PCT/US19/48182, Ideation Virtual Assistant Tools, Aug. 26, 2019.
U.S. Appl. No. 16/551,055, John Cronin, Idea Scoring for Creativity Tool Selection, filed Aug. 26, 2019.
PCT/US19/48122, Idea Scoring for Creativity Tool Selection, Aug. 26, 2019.
U.S. Appl. No. 17/381,718, John Cronin, Idea Scoring for Creativity Tool Selection, filed Jul. 21, 2021.
U.S. Appl. No. 16/550,992 Office Action dated Jun. 2, 2021.

* cited by examiner

IDEATION VIRTUAL ASSISTANT TOOLS

CROSS-REFERENCE TO RELATED APPLICATIONS

The present patent application claims the priority benefit of U.S. provisional patent application 62/722,622 filed Aug. 24, 2018, U.S. provisional patent application 62/722,628 filed Aug. 24, 2018, U.S. provisional patent application 62/722,632 filed Aug. 24, 2018, disclosures of which are incorporated herein by references.

BACKGROUND OF THE INVENTION

1. Field of the Invention

The present disclosure is generally related to tools for a virtual assistant, and more particularly related to tools for an intelligence-driven virtual assistant for automated documentation of new ideas.

2. Description of the Related Art

Organizational tools can help participants in a brainstorming session to optimize their innovation process. Innovative ideas in brainstorming sessions can be achieved via having ideation scheduled, challenged, and collaborated-on. However, the lack of a streamlined operation creates a break in work flow in the field of innovation.

Thus, there exists a need for providing an interactive innovation tool to systematize organization of creative thinking and innovation activities with highly engaging user experiences, and lifelike conversational interactions in real-time during an innovation or ideation session.

SUMMARY OF THE CLAIMED INVENTION

Embodiments of the present disclosure provide an intelligence-driven virtual assistant for automated documentation of new ideas. Such virtual assistant may capture user input data embodying one or more new ideas and intelligently process the same in accordance with creativity tool workflows. Such workflows may further guide development and expansion upon a given idea, while continuing to challenge ideas, provide opportunities to collaborate, and optimize scheduling of ideation sessions for efficiency.

Further embodiments may include systems for guiding conversational creation and innovation sessions. Such systems may include artificial intelligence (AI)-driven speech recognition, chatbots designed to stimulate conversations regarding ideas with one or more human users via auditory or textual prompts, semantic search and discovery into insights and relationships among ideas, technical databases, and scholarly literature, applying machine learning to identify creation patterns and to make decisions regarding promising ideas, knowledge management and discovery of relevant material from various online sources, automated production of an idea creation and development record, context-sensitive dashboard reports and analytics, and speech synthesis.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Embodiments of the present disclosure provide an intelligence-driven virtual assistant for automated documentation of new ideas. During a brainstorming (e.g., ideation, creation, creativity, innovation) session, one or more user participants may discuss and identify one or more ideas. Such ideas may be tracked, catalogued, analyzed, developed, and further expanded upon through use of an intelligence-driven virtual assistant. Such virtual assistant may capture user input data embodying one or more new ideas and intelligently process the same in accordance with creativity tool workflows. Such workflows may further guide development and expansion upon a given idea, while continuing to challenge ideas, provide opportunities to collaborate, and optimize scheduling of ideation sessions for efficiency. Further embodiments may include systems for guiding conversational creation and innovation sessions. Such systems may include artificial intelligence (AI)-driven speech recognition, chatbots designed to stimulate conversations regarding ideas with one or more human users via auditory or textual prompts, semantic search and discovery into insights and relationships among ideas, technical databases, and scholarly literature, applying machine learning to identify creation patterns and to make decisions regarding promising ideas, knowledge management and discovery of relevant material from various online sources, automated production of an idea creation and development record, context-sensitive dashboard reports and analytics, and speech synthesis.

Figure 1:
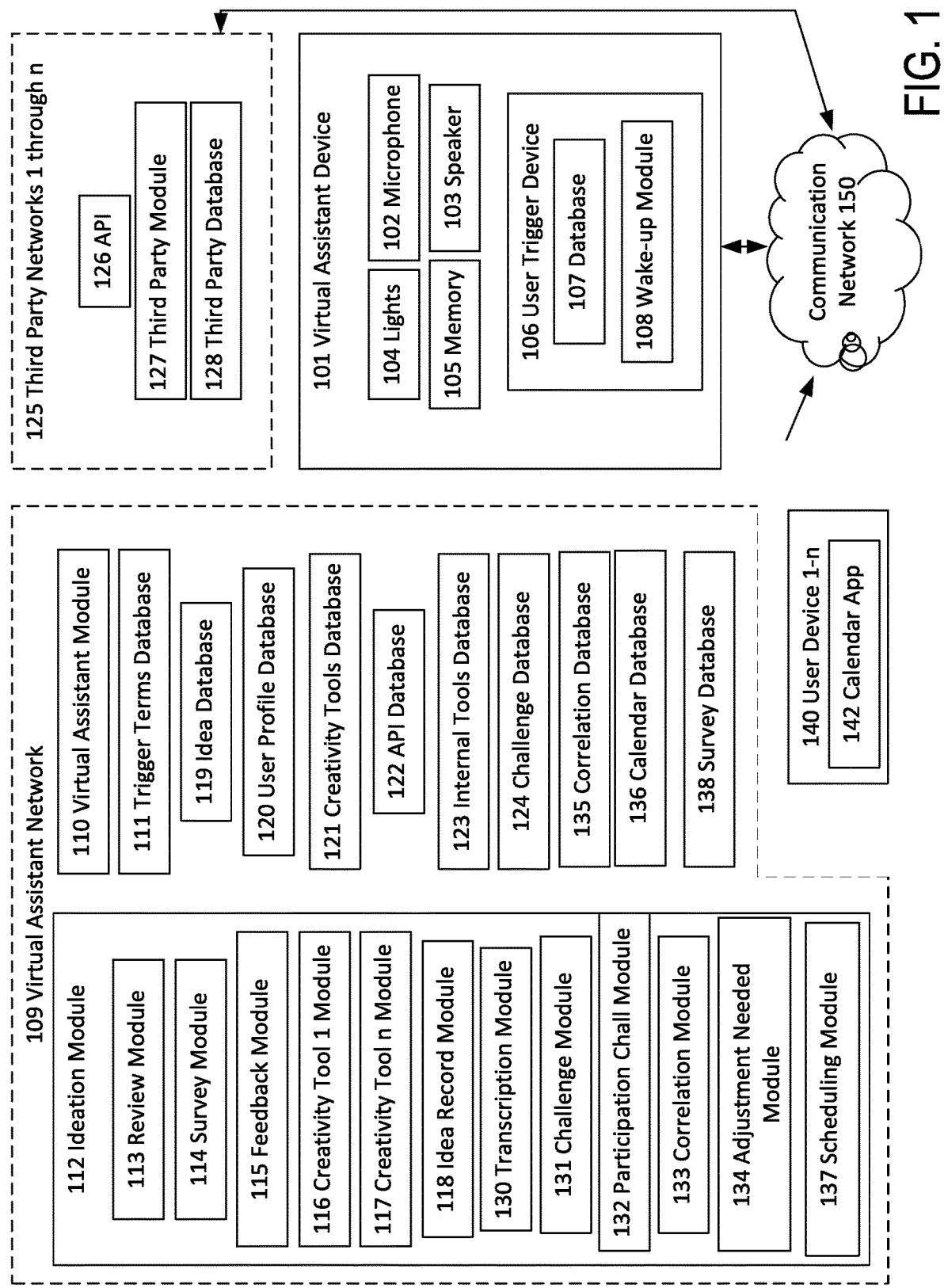
FIG. 1 illustrates an exemplary network environment in which an exemplary system for intelligence-driven virtual assistant for automated documentation may be implemented.

FIG. 1 illustrates an exemplary network environment in which an exemplary system for intelligence-driven virtual assistant for automated documentation may be implemented. The system can be a network having a virtual assistant network in communication with various other networks and devices in accordance with an embodiment. The network may comprise a virtual assistant device 101 for a user to interact with and may comprise a speaker 103, a microphone 102, lights 104, memory 105, and a user trigger device 106 having a database 107 and a wake-up module 108. The speaker 103 may be a smart speaker, a speaker of a computer, etc. The microphone 102 that may constantly capture audio data and store the audio data in the database 107 on the virtual assistant device 101. The lights 104 may illuminate, change colors and used to indicate different action, alerts, states of the virtual assistant device 101, and the type of light may include but not limited to light-emitting diodes (LED). The memory 105 may store information temporarily or permanently.

The user trigger device 106 may be any type of user interface that allows a user to trigger an action in the virtual assistant device 101 and a virtual assistant network 109, including but not limited to, a button (either wirelessly connected or directly connect to the virtual assistant device 101), a graphical button on a Graphical User Interface ("GUI"), etc. The database 107 may store temporarily or permanently speech and audio data captured by the microphone 102 on the virtual assistant device 101 as well as pre-programmed replies. The wake-up module 108 may continuously poll the audio data from the microphone 102 for a "wake-up term", phrase, keyword, or change in user tone or volume, or other audio-based trigger.

The virtual assistant network 109 may be located on a remote server in communication with the virtual assistant device 101 via a communication network 150, or it may be integrated into virtual assistant device 101. The virtual assistant network 109 may comprise a virtual assistant module 110 that may be a virtual assistant such as, but not limited to, Amazon Alexa, Google Assistant, Apple Siri, Microsoft Cortana, etc., wherein certain words, phrases, invocations, or prompts may trigger other applications or modules or actions.

The communication network 150 may be inclusive of wired and wireless networks. The communication network 150 may be implemented, for example, using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques known in the art. The communication network 150 may allow ubiquitous access to shared pools of configurable system resources and higher-level services that may be rapidly provisioned with minimal management effort, often over the Internet and may rely on shared resources to achieve coherence and economies of scale, like a public utility, while third-party clouds enable organizations to focus on their core businesses instead of expending resources on computer infrastructure and maintenance.

The virtual assistant network 109 may comprise a trigger terms database 111 that may load and store words, phrases, terms, invocations, or prompts that are used to trigger certain actions or start applications. The virtual assistant network 109 may comprise an ideation module 112 that may be triggered when the virtual assistant module 110 recognizes a keyword, term or phrase to initiate the ideation module 112. The ideation module 112 may comprise a scoring module 113 that may quantify a score for ideas created and may weight scores based on how frequently a specific tool was used to create ideas.

The ideation module 112 may comprise a challenge module 131 that can present challenges for selection by the user and allow the user to review current challenges that have been created within an enterprise or create a new challenge. Each challenge may represent a problem or a potential area for improvement or development. For example, a challenge may ask the users to improve different aspects of an existing product or to ideate a new product to solve a specified problem. The challenge may therefore ask users to create a new design that will result in more efficient digging, to create a new shovel design, or to increase efficiency of an existing shovel design. Such challenge may therefore include some background or context for the problem, as well as identifying different aspects or parameters of the problem for which a solution is desired.

The challenge module 131 may further search a challenge database 124 and an idea database 119 to identify similar challenges or ideas for similar challenges so ensure users are not duplicating efforts and to help facilitate the improvement of current or new ideas. A participate challenge module 132 may be executed by the challenge module 131 when the user does not want to issue a new challenge but just wants to participate in a challenge. The challenge database 124 may store all of the challenges created by users within an enterprise and the idea database 119 may store the user idea recordings as well as the respective transcribed text, and may also store with each idea if it were developed in connection with a specific challenge.

The ideation module 112 may comprise a review module 113 when executed allows users, such as a review committee, to review ideas in the idea database 119 and ask the inventor questions for more clarity or enablement. Furthermore, the review module 113 may be executed by the virtual assistant module 110 when a corresponding trigger word is used. The ideation module 112 may also comprise a survey module 114 that allows users to provide anonymous feedback and opinions about inventions in the idea database 119. The ideation module 112 may comprise a feedback module 115 that allows the inventor of an idea to review the feedback from the anonymous survey module and respond to inputs from the review module and review committee.

The ideation module 112 may comprise a correlation module 133 that may be triggered by the ideation module 112 when an idea is recorded in order to correlate the ideas value with the type of user(s) and the activity their involved in. The ideation module 112 may also comprise an adjustment needed module 134 allows the user to specify another user or department that needs provide additional value, enablement, etc.

The ideation module 112 may comprise a creativity tool 1 module 116 that may be any number of creativity tools. For example, the ideation module 112 may randomly select different types of creativity tools to use, such as (1) putting a verb randomly selected from a verb database in front of an initial term or (2) putting an associated word randomly selected from an associated database in front of the initial term, and allowing users to select specific creativity tools, etc.

The ideation module 112 may comprise a creativity tool n module 117, which may be any number of creativity tools. For example, the creativity tool n module 117 may randomly select different types of creativity tools to use, allow users to select specific creativity tools, etc. The ideation module 112 may comprise an idea recording module 118 that may be triggered when a prompt comes from the virtual assistant module 110 and begins recording the user idea, wherein the virtual assistant device 101 may store a recording in an idea database 119. A transcription module 130 may transcribe the recording, wherein a transcription of the recording may be stored in the idea database 119 and may be sent to a user terminal or via email or other electronic communication method. The idea database 119 may store the user recordings as well as the respective transcriptions.

A user profile database 120 may store information about the user including but not limited to, email, position, usage data, idea generation, ideation training, etc. A creativity tool database 121 may store data for available creativity tools using APIs. An API database 122 may store all current APIs for the creativity tools. An internal tools database 123 may store data for custom creativity tools not available through an API. For example, the internal tools database 123 may store previous ideas, products, or services that can be improved on or direct a creativity or ideation session.

A correlation database 135 may store the correlations between user features and effective inventions coming from a given creativity tool. A calendar database 136 may store the events on the calendar apps of each user. A scheduling module 137 may identify when users are available to ideate, and delivers to them ideas that require their input, or schedules ideation sessions for the users identified in the adjustment needed module 134. A survey database 138 may contain preprogrammed survey questions that users can answer when they survey an idea and also stores the responses to the questions from the users for each idea surveyed.

A third-party network 125 may be one or more networks on the Internet, cloud, or network that stores module(s) and data for different creativity tools. For example, a third party network 125 may host a word association tool that could be accessed through an API. The word association tool may use a cross-idea association database and may associate words and word strings in a language by analyzing word formations around a word or word string to identify other words or word strings that are equivalents or near equivalents semantically. One method for associating words and word strings may include querying a collection of documents with a user-supplied word or word string, determining a user-defined amount of words or word strings to the left and right of the query string, determining the frequency of occurrence of words or word strings located on the left and right of the query string, and ranking the located words. An application programming interface ("API") 126 of the third party network 125 can be a set of subroutine definitions, communication protocols, and tools for building software, and particularly providing communication protocols to a variety creativity tools and databases on the Internet, cloud or remote servers. A third-party module 127 may input data such as a keyword or phrase to initiate a creativity tool on the third party network 125 and then may output results back to the ideation module 112. A third-party database 128 may store data associated with a creativity tool. For example, for word associated creativity tools, the -party database 128 may store synonyms. A cloud 140 or Internet connected to the communication network 150 may allow for ubiquitous access to shared pools of configurable system resources and higher-level services that can be rapidly provisioned with minimal management effort and the sharing of resources to achieve coherence and economies of scale. User devices 1-n 140 may be mobile devices, smartphones and computing devices of the users in the organization and, a calendar app 142 may be a scheduling application.

Figure 2:
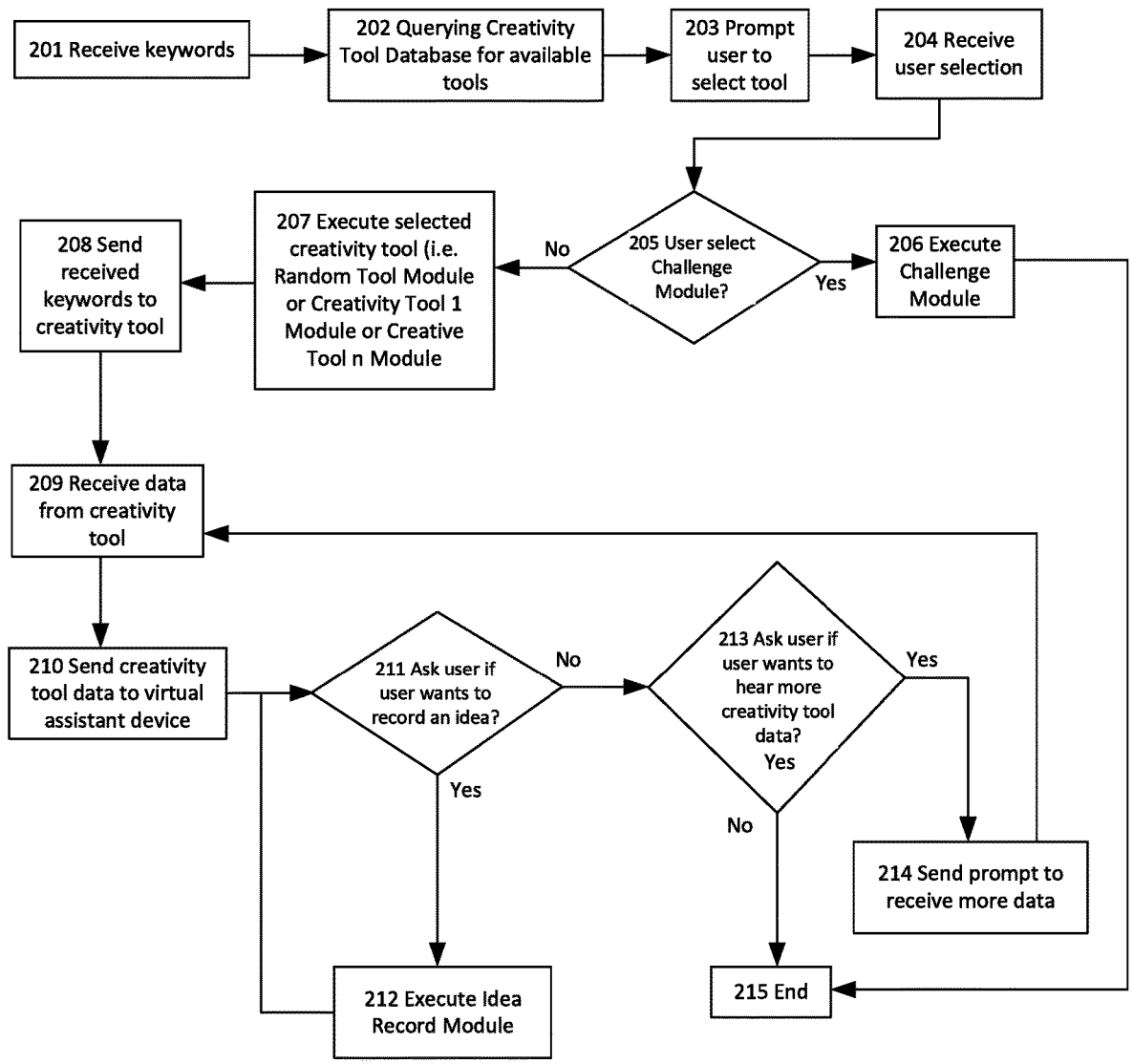
FIG. 2 is a flowchart illustrating an exemplary method of implementing an ideation module in accordance with an embodiment.

FIG. 2 is a flowchart illustrating an exemplary method of implementing an ideation module in accordance with an embodiment. In step 201, keywords may be received from the virtual assistant module 110. In step 202, the creativity tool database 121 may be queried for the available creativity tools or methods, for example, the challenge module 131, or specific tools such as word association, word definition, etc. In step 203, the user may be prompted on the virtual assistant device 101 to select which tool or method the user would like to use. In another embodiment, selecting a creativity tool could be pre-programmed so users do not get an option of which tool to use, or an administrator could have set up the user options or preferences. For example, the user may select the challenge module 131 to create or participate in a challenge.

In step 204, the ideation module 112 may receive the user creativity tool selection via audio data from the virtual assistant device 101. In step 205, the user selection is then checked to see if the user selected the challenge module 131, wherein if the user does select the challenge module, in step 206, the challenge module 131 is executed and the ideation module 112 ends. In step 207, the selected creativity tool module is executed, for example the user selects the challenge module 131 which is then executed. In step 208, the keywords received from the virtual assistant module 110 may be sent to the creativity tool. In step 209, the module receives data or keywords back from the creativity tool. In step 210, creativity tool data may then be sent to the user via the virtual assistant device 101. In step 211, the user may then be asked using the virtual assistant device 101 if the user would like to record an idea. If they user does not want to record an idea, the user is asked if the user want to hear more creativity tool data. In step 212, if yes, the user wants to record an idea, the idea record module 118 is executed. Once the idea record module 118 has completed, the user is asked if the user would like to record another idea and, if not, in step 213, the module ends, and if yes, in step 214, a prompt is sent to the creativity tool to see more data and the module receives the data at 107. In step 215, the module ends and an end command is sent to the virtual assistant module 110.

Figure 3:
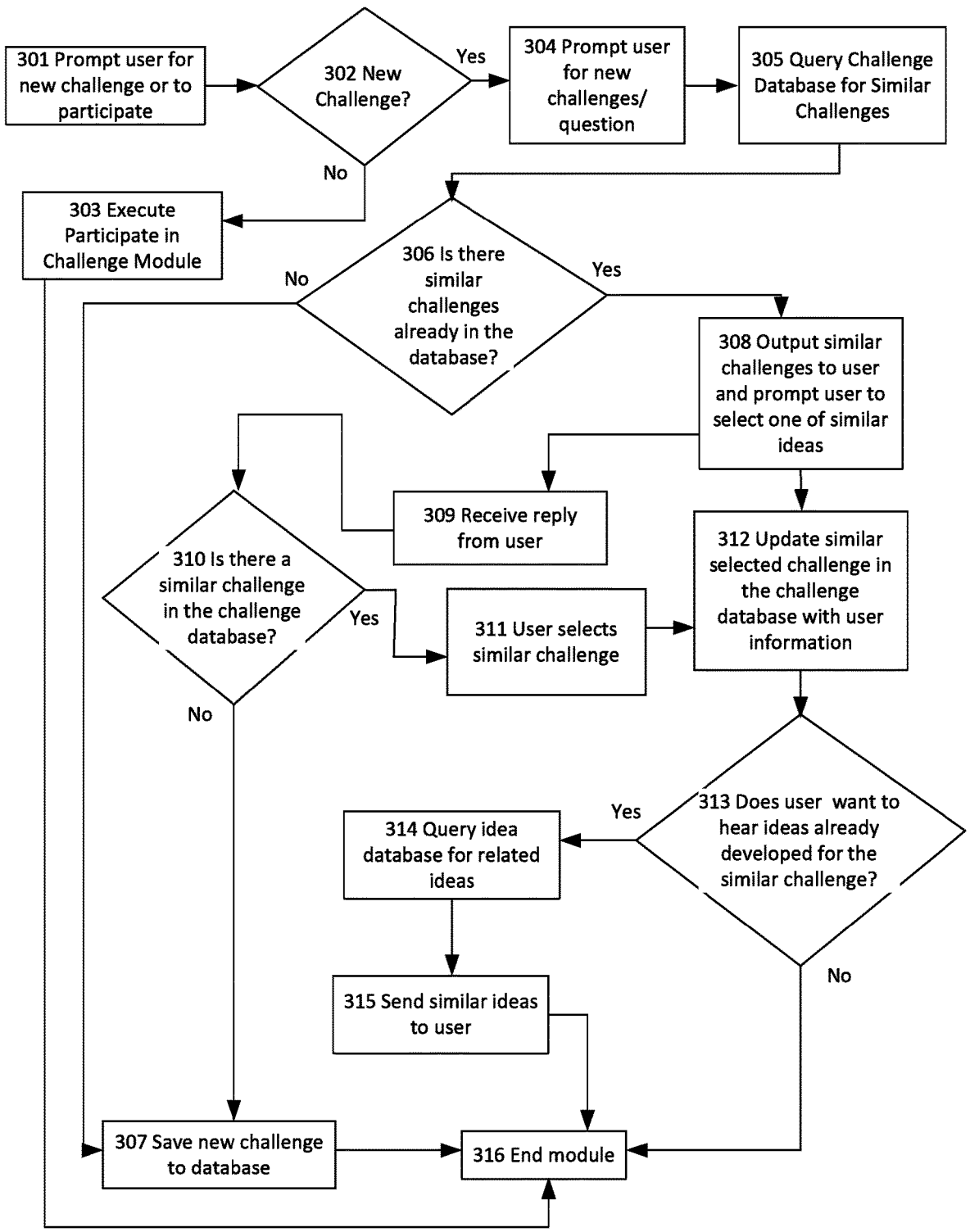
FIG. 3 is a flowchart illustrating an exemplary method of implementing the challenge module 131 in accordance with an embodiment.

FIG. 3 is a flowchart illustrating an exemplary method of implementing the challenge module 131 in accordance with an embodiment. In step 301, the user may be first prompted by the challenge module 131 to determine if the user want to create a new challenge or if the user would like to participate in a previous challenge. In step 302, if the user does not want to create a new challenge, they then want to participate in a challenge that is already in the challenge database 124 which then executes the participate in challenge module 132. In step 303, the participate in challenge module 132 may then be executed, ending the challenge module 132. In step 304, if the user wants to participated in a new challenge, the user is prompted to provide the new challenge (i.e. the challenge could be a structured statement, questions or problem statement). In step 305, the challenge provided by the user may then be used to query the challenge database 124 using a natural language comparison, looking for challenges that are similar to the user provided challenge, the purpose it so identifies similar challenges across an enterprise to limit redundant ideation and identify potential platform technologies, the uses of natural language technologies to identify similar concepts in text. In step 306, if no similar challenges are found, the new challenge may be saved to the challenge database 124 to allow other users to view and participate in the challenge.

In step 307, the new challenge may be saved to challenge database 124. In step 308, if at least one similar challenge is found in the challenge database 124, the challenge module 131 may then output to the user the similar challenge or challenges that were found and prompts the user to select at least one or none of the similar ideas. In step 309, the user may then be asked if one or more of the similar challenges is relevant to their challenge. If not, in step 310, the new challenge is saved to the challenge database 124, going back to step 307. If yes, in step 311, the user may select which challenge is relevant. In step 312, the selected challenge(s) are updated in the challenge database 124, adding in the user information (i.e. user title, name, position, department, etc.) and adding the users phasing of the challenge. In step 313, the user may be asked if the user wants to hear ideas already developed for the similar challenge. If not, the module ends at step 316. If yes, in step 314, the challenge module 131 queries the idea database 119 for any ideas associated with the selected challenge. In step 315, the challenge module 131 then may send the user the related ideas to the challenge that is similar to their idea, and the ideas can be sent to the user via a user interface (i.e. read to the user via audio) or audio function or a visual user interface. In step 405, the user is then prompted to select one of the listed challenges. In step 406, the user challenge selection may be received. In step 407, the user challenge selection may then be used to retrieve any related idea that had already been developed and associated with the selected challenge, this help redundant ideas and allow users to improve on an idea. In step 408, the user may then be prompted to submit their idea. In step 409, the idea record module 118 may be executed and record the user idea and store the new idea in the idea database 119. In step 410, if no, the idea is marked and stored in the idea database 119 and user is then asked if they want to submit another idea. In step 411, if the idea is an improvement on previous idea the user is prompted to select which previous idea it improves on. In step 412, the idea database 119 is then updated, and the record ID of the new idea is added to the previous idea as an improvement. In step 413, if no, the module ends at step 414, and if yes, the user may be prompted for another idea back at step 408.

Table 1 below illustrates an exemplary challenge database. The database comprises (1) a Challenge ID 151 is a unique identifier for the challenge and, (2) a Challenge Description 152 is the description of the actual challenge as described by the user and, (3) a Submitter Name 153 is the name of the user who submitted the challenge and, (4) a Submitter Position 154 is the user position or title within the organization and, (5) a Submitter Business Unit 155 is the user business unit, division or part of an the enterprise and, (6) a Similar Challenge ID 156 is the ID of challenges that users have determined to be similar to the challenge.

TABLE 1

| Challenge ID | Challenge Description | Submitter Name | Submitter Position | Submitter Business Unit | Similar Challenge ID |
|---|---|---|---|---|---|
| 001 | How to improve the control of a drone? | John Smith | President of Drone Division | Drone Division | 002; 004 |
| 002 | How to make it easier for a drone to be controlled by a user? | Jane Doe | Engineering Manager | Drone Division | 001; 004 |
| 003 | How can we speed up the manufacturing of drones? | Mark Twain | Manufacturing Manager | Drone Division | 005 |
| 004 | How to improve the control of remotely controlled vehicles? | Bob Johnson | Director of Vehicle Control | Vehicle Control | 001; 002 |
| 005 | How to automate drone manufacturing? | Mark Twain | Manufacturing Manager | Drone Division | 003 | sent to the user via email so they can review the ideas at a later date to see if any of the related ideas are relevant.

Figure 4:
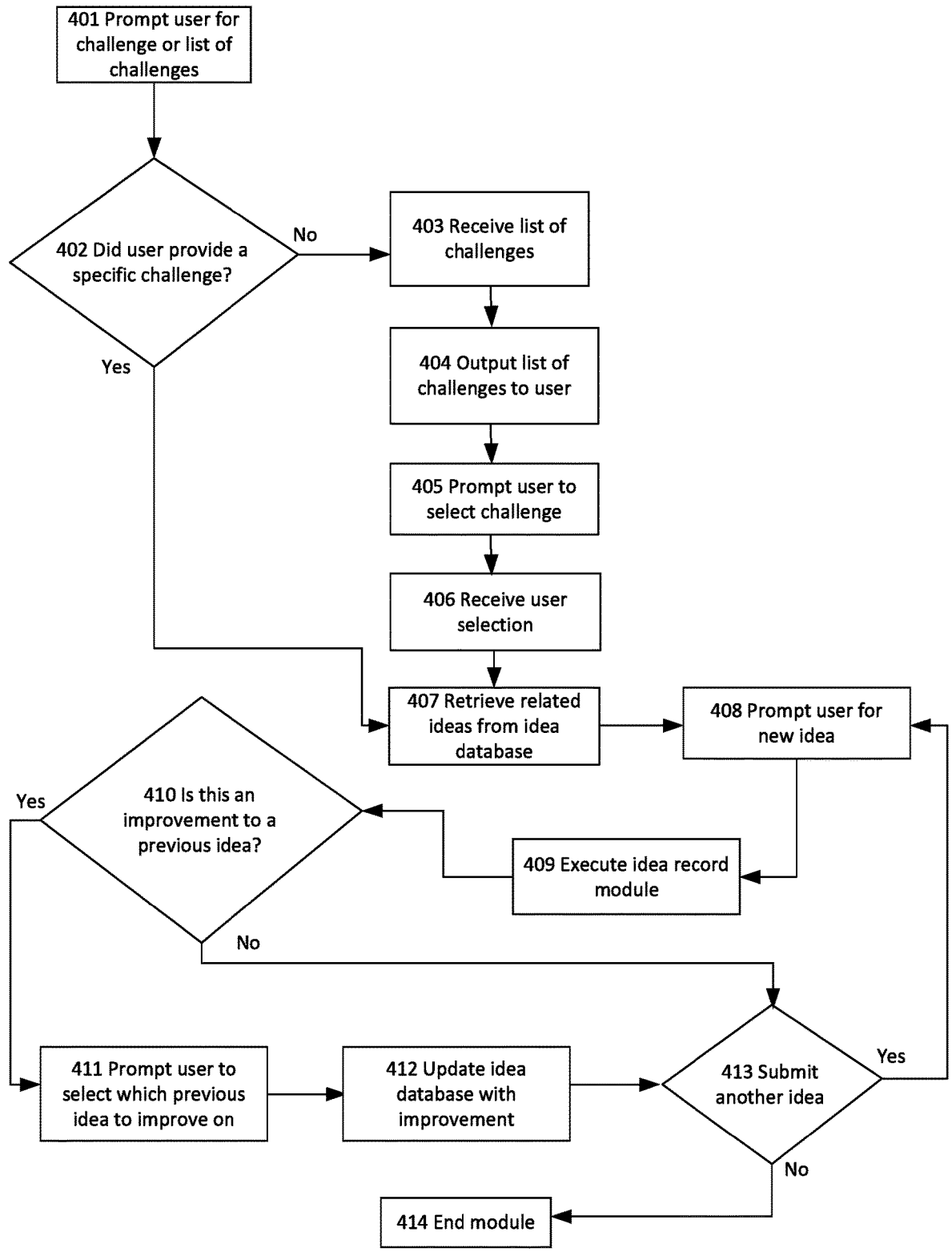
FIG. 4 is a flowchart illustrating an exemplary method of implementing the participate in challenge module 132 in accordance with an embodiment.

FIG. 4 is a flowchart illustrating an exemplary method of implementing the participate in challenge module 132 in accordance with an embodiment. In step 401, the user may first be prompted to provide a specific challenge they want to participate in or if they want to hear a list of challenges. In 402, if yes, then the module queries the idea database 119 for ideas that have already been generated for the selected challenge and skips to step 407. If not, in step 403, the user does not select a specific challenge and thus the module queries the challenge database 124 for a list of challenges. In step 404, the list of challenges is then outputted to the user through the virtual assistant device 101 either using the Table 2 below illustrates an exemplary idea database 119. The database comprises (1) an Idea 157 is a unique identifier for each idea in the Idea database and, (2) an Audio file 158 stores the recorded audio file captured from the idea record module and, (3) a Transcribed Text 159 is the transcribed text from the audio file and, (4) a Submitter Name 160 is the user name who submitted the idea and, (5) an Associated Challenge(s) 161 stores the challenge(s) that the idea(s) were developed for and, (6) Ideas 162 that improve this Idea stores the Idea ID of other ideas that improve on the idea and, (7) Ideas 163 that this idea Improves stores the Idea ID that the current Idea is improving upon.

TABLE 2

| Challenge ID | Challenge Description | Submitter Name | Submitter Position | Submitter Business Unit | Similar Challenge ID |
|---|---|---|---|---|---|
| 001 | How to improve the control of a drone? | John Smith | President of Drone Division | Drone Division | 002; 004 |
| 002 | How to make it easier for a drone to be controlled by a user? | Jane Doe | Engineering Manager | Drone Division | 001; 004 |
| 003 | How can we speed up the manufacturing of drones? | Mark Twain | Manufacturing Manager | Drone Division | 005 |
| 004 | How to improve the control of remotely controlled vehicles? | Bob Johnson | Director of Vehicle Control | Vehicle Control | 001; 002 |
| 005 | How to automate drone manufacturing? | Mark Twain | Manufacturing Manager | Drone Division | 003 |

Table 3 below illustrates an exemplary creativity tools database. The database comprises (1) a Creativity Tool Name 164 which stores a brief description of the creativity tool and, (2) a Creativity Tool Description 165 stores a detailed description of the creativity tool and, (3) a Creativity Tool Module 166 stores the module name used to access the creativity tool and, (4) a Creativity Tool Third Party 167 stores the third party network(s) that are used for the creativity tool.

TABLE 3

| Creativity Tool Name 164 | Creativity Tool Description 165 | Creativity Tool Module 166 | Creativity Tool Third Party 167 |
|---|---|---|---|
| Randomize Creativity | The randomized creativity tool randomly select different available creativity tools | Random Tool Module | Third Party Network 1 Third Party Network 2 . . . Third Party Network n |
| Word Association | The word association tool uses a given word or phrase and using an API accesses a database of associated words or synonyms | Creativity Tool 1 Module | Third Party Network 1 |
| Challenge Module | The challenge module allows users to create challenges within their organization or allow users to participate in specific challenges | Challenge | Internal Tool |
| . . . | . . . | . . . | . . . |
| Creativity Tool n | Creativity tool n description | Creativity Tool n Module | Third Party Network n |

Figure 5:
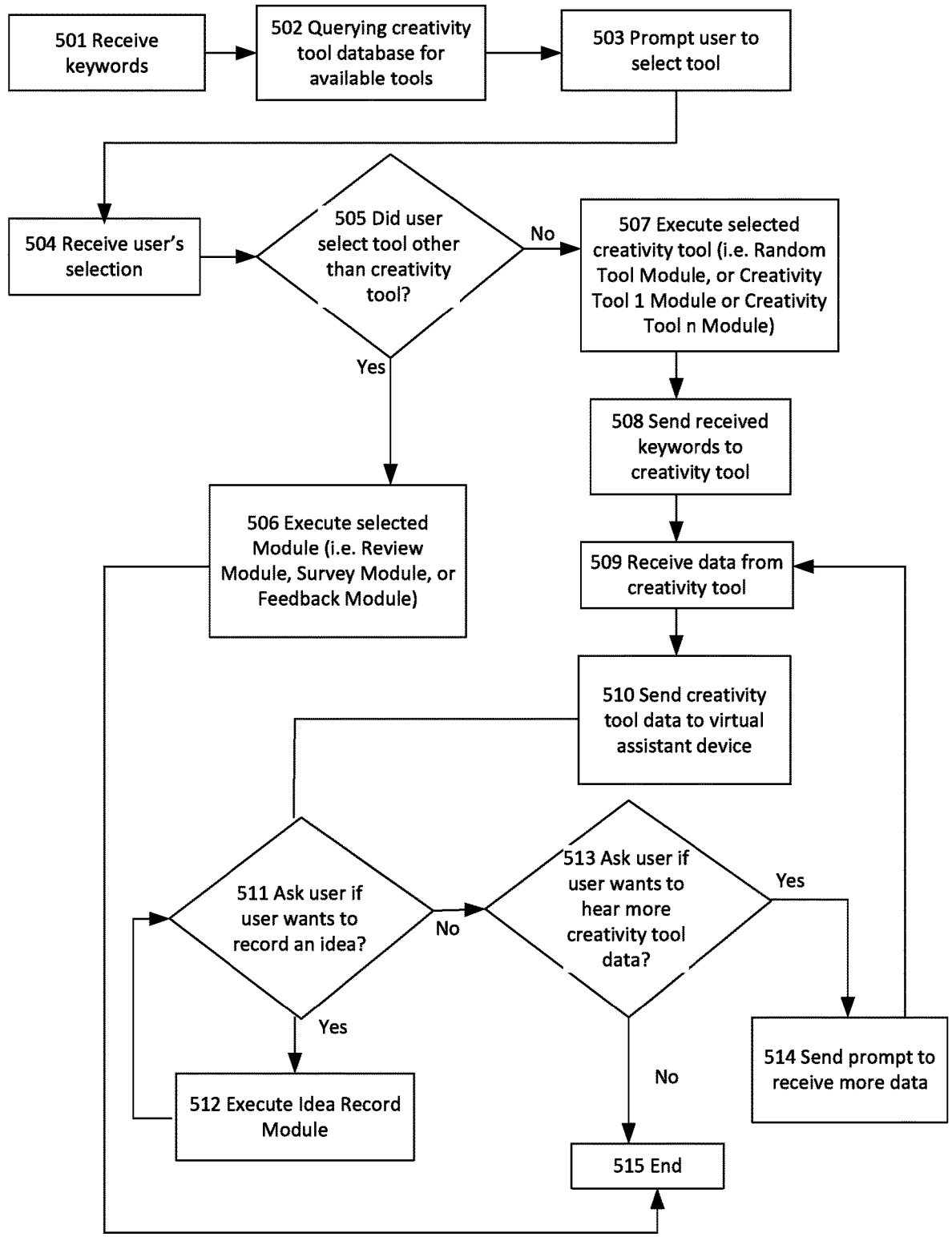
FIG. 5 is a flowchart illustrating an exemplary method of implementing an ideation module in accordance with an embodiment.

FIG. 5 is a flowchart illustrating an exemplary method of implementing an ideation module in accordance with an embodiment. In step 501, keywords may be received from the virtual assistant module 110. In step 502, the creativity tool database 121 may be queried for the available creativity tools or methods, for example, the challenge module 131, or specific tools such as word association, word definition, etc. In step 503, the user may be prompted on the virtual assistant device 101 to select which tool or method the user would like to use. In another embodiment, selecting a creativity tool could be pre-programmed so users do not get an option of which tool to use, or an administrator could have set up the user options or preferences,.

In step 504, the ideation module 112 may receive the user creativity tool selection via audio data from the virtual assistant device 101. In step 505, the user selection is then checked to see if the user selected the challenge module 131, wherein if the user does select the challenge module, in step 506, the review module 113, survey module 114, or the feedback module 115 is executed and the ideation module 112 ends. In step 507, the selected creativity tool module is executed. In step 508, the keywords received from the virtual assistant module 110 may be sent to the creativity tool. In step 509, the module receives data or keywords back from the creativity tool. In step 510, creativity tool data may then be sent to the user via the virtual assistant device 101. In step 511, the user may then be asked using the virtual assistant device 101 if the user would like to record an idea. If they user does not want to record an idea, the user is asked if the user want to hear more creativity tool data. In step 512, if yes, the user wants to record an idea, the idea record module 118 is executed. Once the idea record module 118 has completed, the user is asked if the user would like to record another idea and, if not, in step 213, the module 5 ends, and if yes, in step 514, a prompt is sent to the creativity tool to see more data and the module receives the data at 107. In step 515, the module ends and an end command is sent to the virtual assistant module 110.

Figure 6:
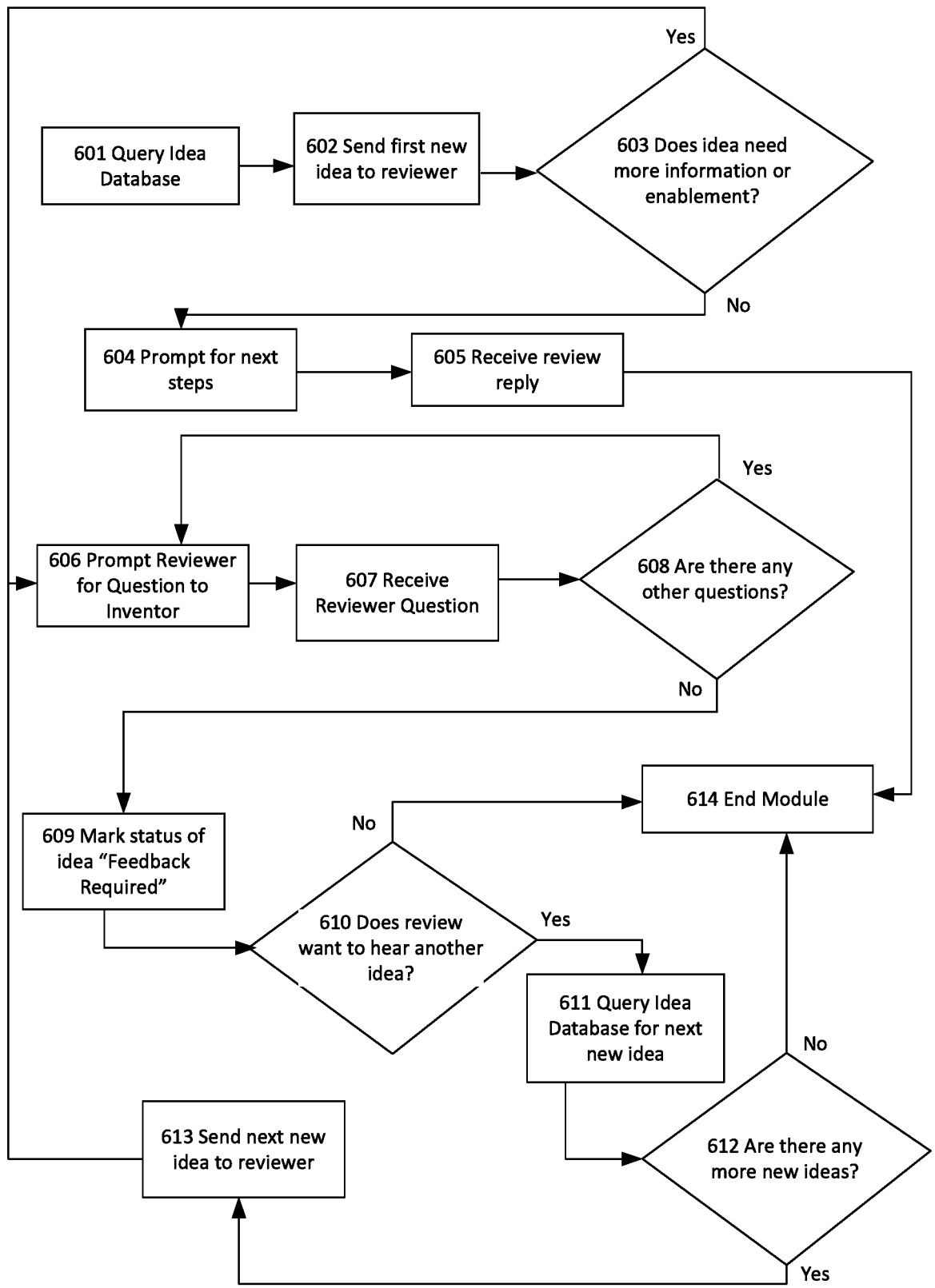
FIG. 6 is a flowchart illustrating an exemplary method of implementing the review module 113 in accordance with an embodiment.

FIG. 6 illustrates an example of a flow diagram illustrating an exemplary method of implementing the review module 113 in accordance with an embodiment. In step 601, the idea database 119 may be queried for new ideas that have not been reviewed by the review committee. In step 602, a first new idea is sent to the virtual assistant device 101 where the idea is dictated to the reviewer. In step 603, the reviewer may be asked if the idea needs more information or enablement. In step 604, if the idea does not need any additional enablement or information, the reviewer may be prompted for the next step for the idea. The prompt can be a preprogrammed selection such as, "File as trade secret", "Develop Disclosure" or "Publish Idea". In step 605, the reviews reply to the prompt may be received and stored with the idea in the idea database 119 updating the current status of the idea.

In step 606, if in step 603 the idea requires additional information or enablement the reviewer is prompted to provide a question they would like the inventor to answer. In step 607, the reviewer questions may be received and stored in the idea database 119. In step 608, the reviewer may be asked if they have any further questions they wish the inventor to answer. In step 609, if no additional questions are needed, the idea status is updated in the idea database 119 to "Feedback Required." In step 610, if the reviewer does not want to hear another idea the module ends, otherwise the module moves to step 611 wherein the idea database 119 is queried again for the next new idea. In step 612, if the query for the next new idea returns no new ideas, the module ends. In step 613, if there is another new idea that needs to be reviewed the idea is sent to the user through the virtual assistant device 101 and the review module 113 begins to repeat from step 603. In step 614, the review module 113 ends when there are no more new ideas to review or the users is done reviewing ideas.

Figure 7:
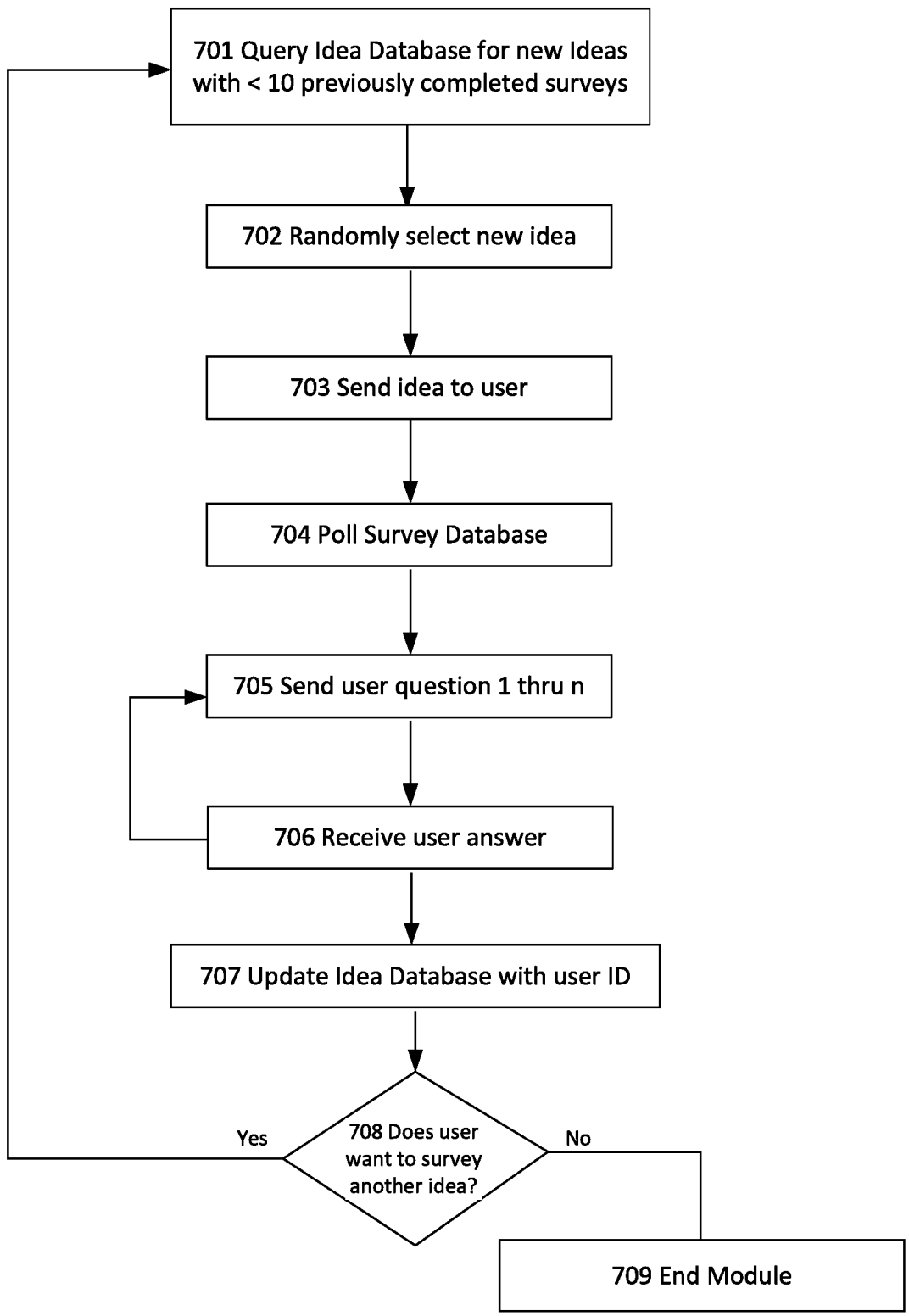
FIG. 7 is a flowchart illustrating an exemplary method of implementing the survey module 114 in accordance with an embodiment.

FIG. 7 illustrates an example of a flow diagram illustrating an exemplary method of implementing the survey module 114 in accordance with an embodiment. In step 701, the idea database 119 may be queried to populate a list of new ideas from the idea database 119 that have less than a threshold number, such as 10, of previously completed surveys and that has not already been reviewed by the user, wherein the number of completed surveys can be preprogrammed with any range. In step 702, the survey module 114 may randomly select a new idea from the list generated in step 701 and in step 703, the selected idea is sent to the user through the virtual assistant device 101. In step 704, the survey database 138 may be polled for the preprogrammed survey question. In step 705, the user may be sent each question in the survey database 138, each question is sent to the user one at a time and a response for each is stored in the survey database 138. One of the questions may be an open ended question or opportunity to voice a general opinion or comments. In step 706, the user reply to each question may be stored in the survey database 138. Steps 705 and 706 are repeated until all questions are answered by the user. In step 707, the user idea may be added to the idea they just surveyed in the idea database 119, which may then be used in step 701 so a user does not survey an idea more than once. In step 708, the user is asked if they want to survey another idea, if not, the module ends. If the user requests to survey another, the process repeat from step 701 and, in step 709, the module ends when the user is done surveying ideas.

Figure 8:
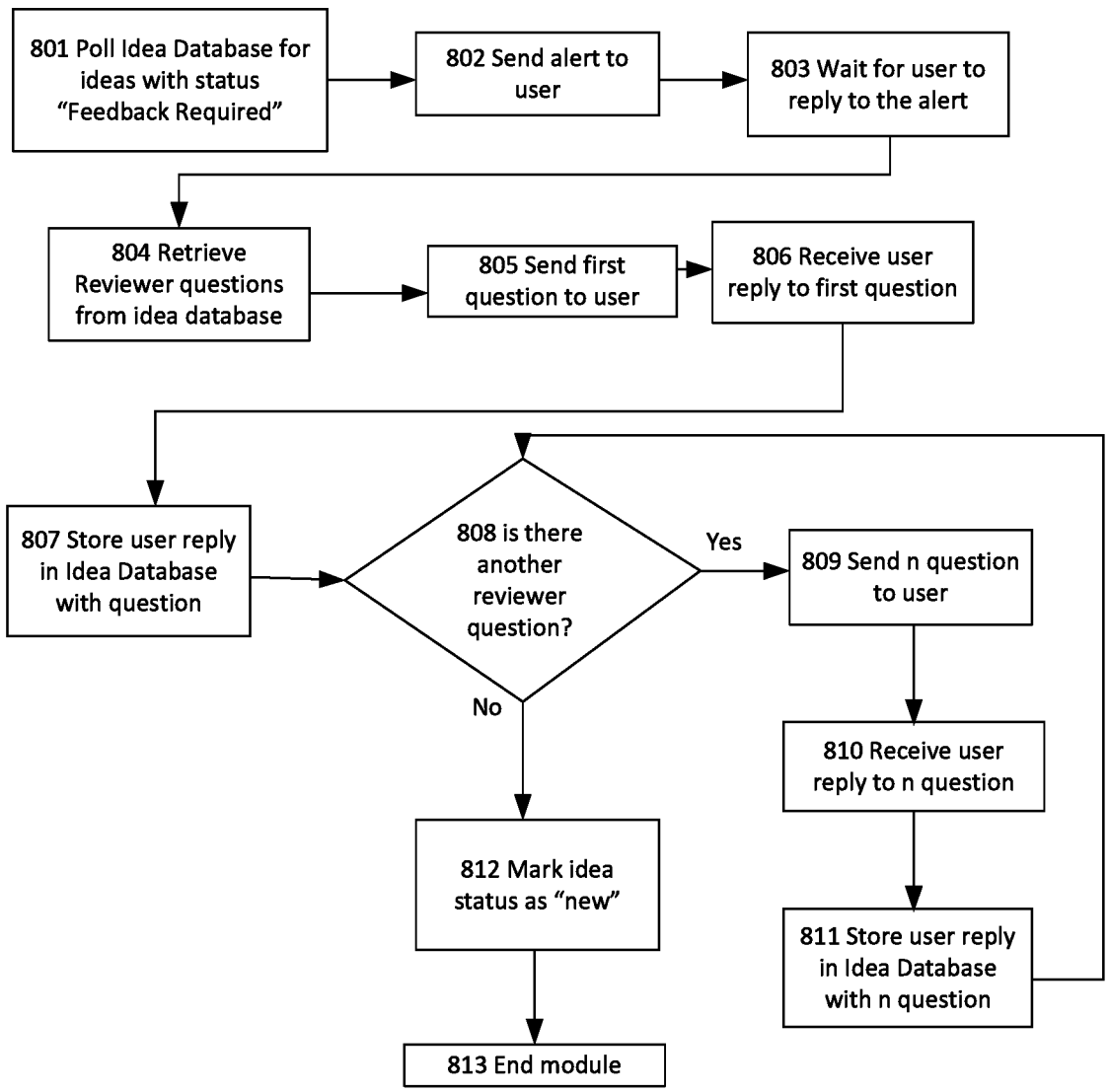
FIG. 8 is a flowchart illustrating an exemplary method of implementing the feedback module 115 in accordance with an embodiment.

FIG. 8 illustrates an example of a flow diagram illustrating an exemplary method of implementing the feedback module 115 in accordance with an embodiment. In step 801, the idea database 119 may be polled for ideas with the status of "Feedback Required." In step 802, the user may be sent an alert through the virtual assistant device if one of the user ideas has a status of "feedback required." The alert may include a visual alert such as light on the virtual assistant device 101 or an audio alert. In step 803, the module may wait until the user responds to the alerts. In step 804, the questions created by reviewers may be retrieved from the idea database 119. In step 805, the first question from the reviewer may be sent to the user through the virtual assistant device 101. In step 806, the user reply to the first question is received and stored in the idea database. In step 807, the user reply to the first question may be stored with the corresponding question. In step 808, the feedback module 115 may poll for another reviewer question from the idea database 119. If there are no more questions the idea status is updated to new and the feedback module 115 ends. If there is another question, the user next question may be sent to the user and in step 809, if there is another question, the user may be sent the next question and, in step 810, the user reply to the next question may be received. In step 811, the user reply is stored in the idea database 119 with the corresponding question, then the module repeats from Step 808 until there are no more questions for the user. In step 812, the idea status is updated to "new" so that the review will see the reply to the reviewer questions and, in step 813, the module ends once the idea is marked as new.

Table 4 below illustrates an exemplary idea database 119. The database comprises (1) an Idea ID 168 is a unique Identification number to identifying ideas in the database and, (2) an audio file 169 which stores the recorded audio file captured from of the idea record module and, (3) a transcribed text transcription 170 is transcribed text of the audio file and is stored once transcribed and, (4) submitter name 171 date is the date the idea was recorded and, (5) a user 172 is the user name who submitted the idea and, (5) the Associated Challenge(s) stores the challenge(s) that the idea(s) were developed for or some unique identifier of the user who recorded the idea and, (6) the Ideas that Improve this Idea stores Status 173 is the Idea IDstatus of other ideas that improve on the idea current invention in the review process i.e. new, reviewed, etc. and, (7) Ideas that this idea Improves stores the Idea ID that the current Idea is improving upon review questions 174 are the questions from the reviewer and, (8) a User Reply 175 is the stored reply from the user and, (9) Surveyors 176 stores the User IDs of users who have surveyed the idea.

TABLE 4

| Idea ID 168 | Audio File 169 | Text Transcription 170 | Date 171 | User 172 | Status 173 | Review Questions 174 | User Replies 175 | Surveyors 176 |
|---|---|---|---|---|---|---|---|---|
| 001 | 001.wav | The idea here is to have a pencil that can write itself | Jul. 31, 2018 | John Smith | Feedback required | Question 1a Question 1b Question 1c Question 1d | | User001; User002 |
| 002 | 002.wav | The widget should be improved using multiple sensor such as | Jul. 31, 2018 | Jane Doe | New | Question 1b Question 2b Questioned 3b | Reply 1b Reply 2b Reply 3b | User001; User003 |

TABLE 4-continued

| Idea ID 168 | Audio File 169 | Text Transcription 170 | Date 171 | User 172 | Status 173 | Review Questions 174 | User Replies 175 | Surveyors 176 |
|---|---|---|---|---|---|---|---|---|
| 033 | 003.wav | temperature and optical sensors This new idea would improve on current computer mouse technologies by putting a heater in the mouse to warm the user hand | Jul. 31, 2018 | Jeff Jackson | New | | | |
| 004 | 004.wav | . . . | Jul. 31, 2018 | John Smith | Feedback Required | Question 1c | | User001 |
| 005 | 005.wav | . . . | Jul. 31, 2018 | John Smith | New | Question 1d | Reply 1d | |

Table 5 below illustrates an exemplary survey database 138. The database comprises process begins with (1) a Creativity Tool Name which stores a brief description of the creativity tool and an Idea ID 177 is the idea of the idea from the idea database 119 that is being surveyed and, (2) a Creativity Tool Description stores a detailed description of the creativity tool and a User ID 178 is from the User profile database of the user who reviewed the idea and, (3) the Creativity Tool Module stores the module name used to access the creativity tool Question 1 179 is the first preprogrammed question for the survey where they user reply is stored and, (4) the Creativity Tool Third Party stores the third party network(s) that are used for the creativity tool. Question n represents any number of additional questions 180 after Question 1 and, (5) General Comments 181 field allows the user surveying the idea to leave a general comment beyond the preprogrammed question.

TABLE 5

| Idea ID 177 | User ID 178 | Question 1 179 | Question 2 180 | General Comments 181 |
|---|---|---|---|---|
| 001 | User001 | User001 Reply to Question 1 | User001 Reply to Question n | User001 General Comments |
| 002 | User002 | User001 Reply to Question 2 | User001 Reply to Question n | User002 General Comments |
| 003 | User001 | User001 Reply to Question 1 | User001 Reply to Question n | User001 General Comments |
| 004 | User003 | User001 Reply to Question 3 | User001 Reply to Question n | User003 General Comments |
| 005 | User001 | User001 Reply to Question 1 | User001 Reply to Question n | User001 General Comments |

Figure 9:
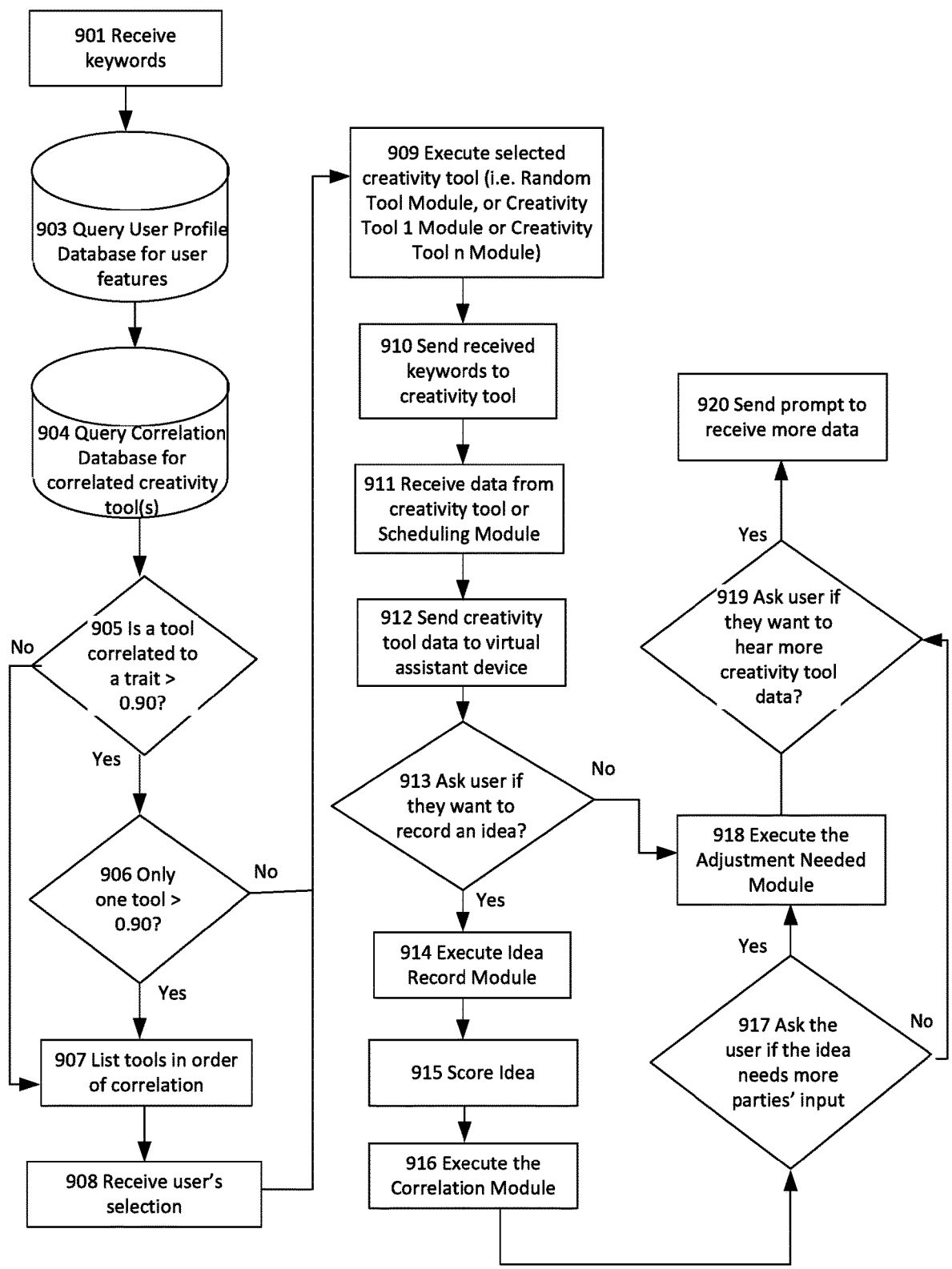
FIG. 9 is a flowchart illustrating an exemplary method of implementing the ideation module 112 in accordance with an embodiment.

FIG. 9 illustrates an example of a flow diagram illustrating an exemplary method of implementing the ideation module 112 in accordance with an embodiment. In step 901, keywords may be received from the virtual assistant module 110. In step 902, the creativity tools database 11 may be queried for the available creativity tools or methods, for example, random tool selection, or specific tools such as word association, word definition, AHA deck etc. In step 903, the user profile database 120 may be queried for user features, such as age, occupation, expertise, etc. In step 904, the correlation database 135 may be queried for creativity tools that are correlated to user features present in the current group. In step 905, the ideation module 112 queries whether there a tool that is correlated to a present user trait with a correlation coefficient greater than a certain threshold, such as 0.90. That number is chosen as an example in this embodiment and could be higher or lower in practice. In step 906, the ideation module 112 queries whether there is only one tool that has a greater than 0.90 correlation coefficient, for example. If there is only one, skip to step 909. If there is more than one, in step 907, the correlated tools may be listed for the user in order of most correlated to least and poll for the user selection. In step 908, the user selected creativity tool may be received and in step 909, the selected creativity tool module may be executed, for example the user selects Creativity Tool 1, then creativity tool 1 module is executed.

In step 910, the keywords received from the virtual assistant module 110 may be sent to the creativity tool. In step 911, the module receives data or keywords back from the creativity tool and in step 912, the creativity tool data is then sent to the user via the virtual assistant device 101. In step 913, the user is then asked using the virtual assistant device 101 if they would like to record an idea. If the user does not want to record an idea they are asked if they want to hear more creativity tool data, then in step 914, if yes, the user wants to record an idea the record module is executed, once the record module has completed the user is asked if they wish to record another idea. In step 915, the idea may be scored in a manner and in step 916, the correlation module 133 may be executed to compare the score of the created idea with the user feature(s) and the creativity tool used.

The ideation module 112 continues to loop back to step 907 until the user wants to select a new creativity tool or end the session. In step 917, the user may then be asked if the idea needs more input from an additional party or parties, such as a specific individual or a member of a specific department such as marketing or engineering. In step 918, the adjustment needed module 134 may be executed to direct the idea to the appropriate parties for additional enablement or development. In step 919, the user may then be asked using the virtual assistant device 101 if they would like to record an idea. If the user does not want to record an idea, the user is asked if they want to hear more creativity tool data and, if yes, in step 920 the user does want to hear more creativity tool data, a prompt is sent to the creativity tool to see more data and the module receives the data at step 911.

Figure 10:
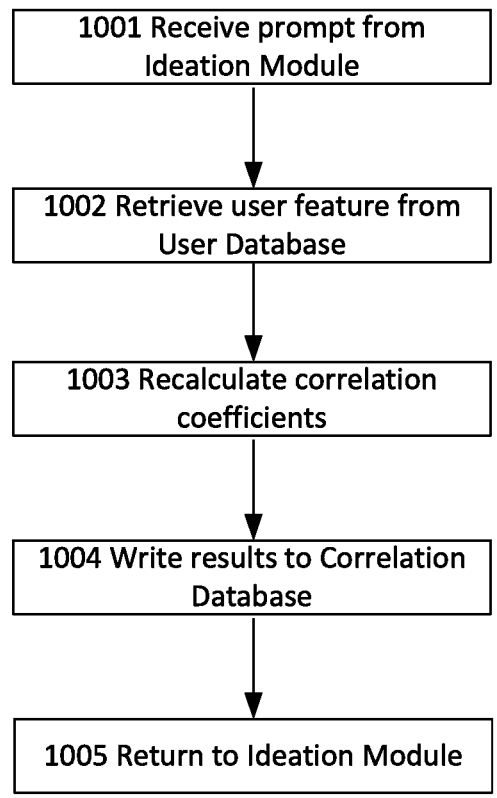
FIG. 10 is a flowchart illustrating an exemplary method of implementing the correlation module 133 in accordance with an embodiment.

FIG. 10 illustrates an example of a flow diagram illustrating an exemplary method of implementing the correlation module 133 in accordance with an embodiment. In step 1001, a prompt from the ideation module 112 may be received. In step 1002, user features may be received from the user profile database 120. User features include attributes of the user and their role, such as a 42-year-old engineer or a 24-year-old marketing department head, as well as activities the user is engaged in. These activities could be things such as eating lunch or answering emails. In this embodiment the activities are inferred from time of day and the calendar database contents. The new idea record coming into the system scores above the organizationally determined threshold that makes an idea valuable to pursue. The system may then retrieves the user features, in this example an engineer at 12:30 PM, and retrieves the existing correlation data between the user features and positive idea value and, in step 1003 recalculate the correlation coefficients between the user features. In this example, there exists a high correlation between engineers and lunch time ideas that score well and in step 1004 the updated correlation coefficients may be written in the correlation database 135. In step 1005, the system may return to the ideation module 112.

Figure 11:
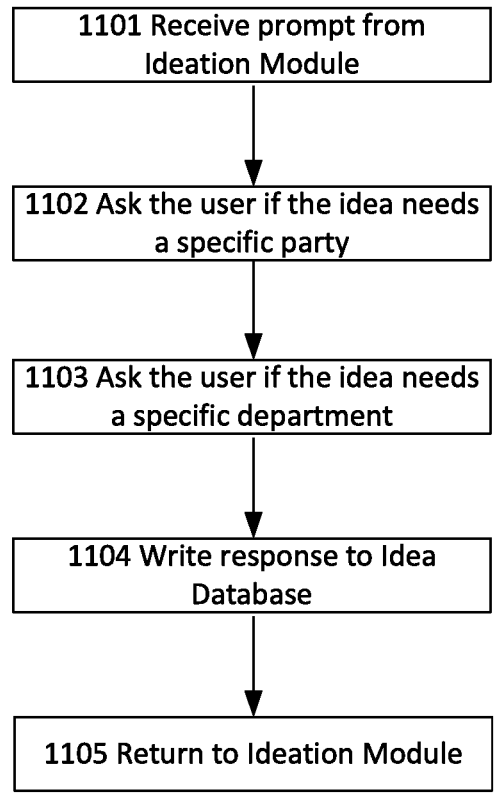
FIG. 11 is a flowchart illustrating an exemplary method of implementing the adjustment needed module 134 in accordance with an embodiment.

FIG. 11 illustrates an example of a flow diagram illustrating an exemplary method of implementing the adjustment needed module 134 in accordance with an embodiment. In step 1101, a prompt from the ideation module 112 may be received that the idea created by the current user needs additional information or enablement from another system user. In step 1102, the user may be asked if the idea needs input from a specific party, such as the director of marketing. In step 1103, the user may be asked if the idea needs input from a specific department, such as any member of the marketing department. In step 1104, the user response may be written to the idea database 119 and in step 1105 returning to the ideation module 112.

Figure 12:
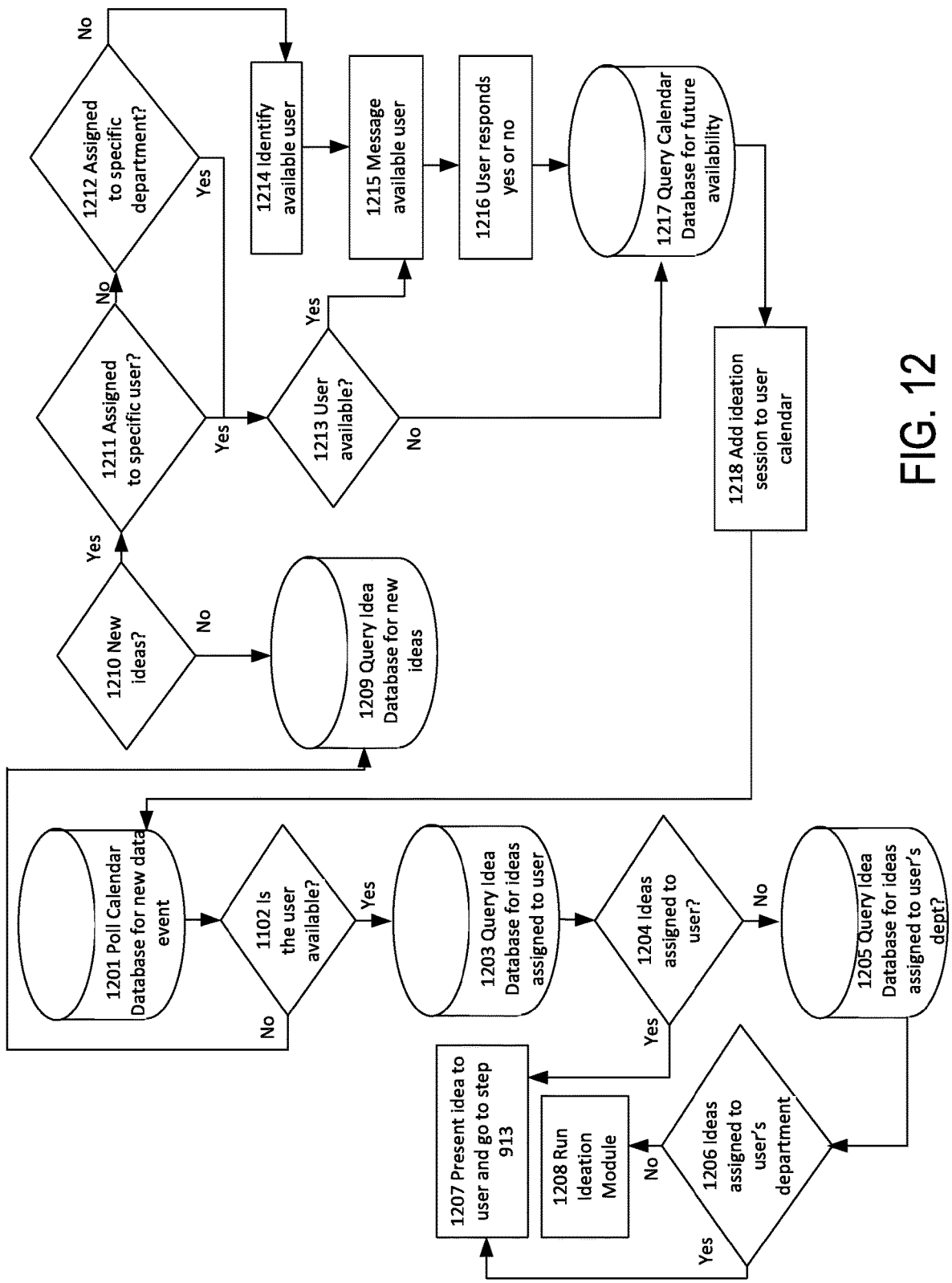
FIG. 12 is a flowchart illustrating an exemplary method of implementing the scheduling module 137 in accordance with an embodiment.

FIG. 12 illustrates an example of a flow diagram illustrating an exemplary method of implementing the scheduling module 137 in accordance with an embodiment. In step 1201, the calendar database 136 is polled for new data events, such as a new calendar event being added or an existing event being moved or cancelled. In step 1202, the scheduling module 137 may determine if the new data event corresponds to the user related to that data event being currently available for ideation. In step 1203, the idea database 119 may be queried for ideas assigned to the available user. In step 1204, the scheduling module 137 may determine if the available user has any ideas assigned to them. In step 1205, the scheduling module 137 may query the idea database 119 for ideas assigned to the available user department. In step 1206, the scheduling module 137 may determine if the available user department has any ideas assigned to them. In step 1207, the scheduling module 137 may present the idea from the idea database 119 to the user and go to step 913 of the ideation module 112. In step 1208, if no ideas are assigned to the user or the department, an ideation session may begin with the user at the beginning of the ideation module 112. In step 1209, if the new data event does not correspond to the user being currently available for an ideation session, the idea database 112 may be queried for ideas added since the last query.

In step 1210, the scheduling module 137 may determine if any new ideas are present in the idea database 119. In step 1211, the scheduling module 137 may determine if the new idea(s) are assigned to a specific user. In 1212, the scheduling module 137 may determine if the new idea(s) are assigned to a specific department. In step 1213, the scheduling module 137 may determine if the needed user(s) is available. In step 1214, the scheduling module 137 may identify any available user(s) when the new ideas do not call for a specific user or department and, (15) 515 messaging the available user(s).

In step 1216, the scheduling module 137 may poll for the messaged user(s) to respond "Yes" they do want to start an ideation session, or "No" they do not want to ideate right now. If they do want to ideate they are returned to the ideation module 112. If they return to the ideation module 112 to work on an existing idea, the user starts at step 913 of the ideation module 112. If the user is not working on an existing idea the user may be returned to the beginning of the ideation module 112, which will determine the ideal tool correlated with the user current activity and other user features. If the user responds "No" they do not want to ideate right now the scheduling module 137 may, in step 1217, query the calendar database 136 for future availability. If the new data event is for an idea that requires a specific party or department the list of users whose availability is queried in the calendar database 136 is limited to those identified users. If the new data event is for an unassigned idea the system looks for the next available opening in the calendar database 136. In step 1218, an ideation session may be added to the identified opening in the calendar database 136 and return to polling the calendar database 136 for a new data event.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for implementing virtual assistant-based ideation management, the method comprising:
storing a challenge database in memory, the challenge database including information regarding a plurality of challenges each providing a different prompt;
recording audio data via a microphone during a session, wherein the recorded audio data is in response to questions output by a virtual assistant;
executing instructions stored in memory, wherein execution of the instructions by one or more processors:
analyzes the recorded audio data to identify that the recorded audio data indicates a user selection for one of the stored challenges, queries the challenge database to find the selected challenge and similar challenges using natural language comparison to the stored information regarding the challenges, outputs a list via the virtual assistant, wherein the list includes the selected challenge and one or more challenges identified as similar based on the natural language comparison, retrieves one of the challenges in the list, wherein the retrieved challenge is updated according to a creation pattern identified by application of machine learning and based on an idea that is identified by further analysis of the recorded audio data, and adds one or more challenges based on the identified creation pattern, wherein the challenges extend from identified ideas that were generated from previous challenges; and displaying the updated challenge information with the identified idea on a display of a user device associated with the session.

2. The method of claim 1, further comprising prompting a user in the session to create a new challenge.

3. The method of claim 2, further comprising updating the challenge database with the new challenge based on a response to the prompt, the new challenge stored in association with information regarding the user.

4. The method of claim 2 further comprising querying an idea database in memory for ideas that correspond to the new challenge.

5. The method of claim 4, further comprising:
identifying one or more ideas in the idea database that correspond to the new challenge; and
generating a menu of options based on the identified ideas, the menu of options including one or more actions available to take upon the identified ideas.

6. The method of claim 5, wherein at least one option is associated with a set of pre-programmed prompts, and further comprising storing a selected pre-programmed prompt in association with a status of the identified ideas.

7. The method of claim 6, wherein at least one option is associated with a comment field, and further comprising receiving user input corresponding to the comment field, and further comprising storing the user input in association with a status of the identified ideas.

8. The method of claim 1, further comprising receiving a plurality of ideas in response to the selected challenge.

9. The method of claim 8, further comprising storing the plurality of ideas in an idea database in memory, the plurality of ideas stored as a group associated with the selected challenge.

10. The method of claim 9, further comprising identifying that at least one of the plurality of ideas is an improvement on another one of the plurality of ideas.

11. The method of claim 10 further comprising updating a record associated with an other idea, the updated record identifying that the other idea is the improvement on the at least one idea.

12. The method of claim 1, further comprising querying an idea database to populate a list of new ideas each associated with fewer than a threshold number of challenges.

13. The method of claim 12, further comprising executing a survey module, wherein execution of the survey module by the one or more processors:

selects a new idea at random from the list of new ideas;
sends the selected new idea to the user via a virtual assistant device;

polls a survey database for preprogrammed survey questions;
presents each polled survey question in the survey database to the user, via the virtual assistant device; and
stores the responses in the survey database.

14. The method of claim 13, further comprising:
analyzing each of the recorded responses for one or more indicators of a new idea;
storing at least one of the analyzed responses identified as being associated with an indicator of a new idea, the at least one analyzed response stored as the new idea;
polling, via a feedback module, for another question from the idea database; and
updating a status when there are no more questions remaining from the idea database.

15. The method of claim 1, further comprising:
polling a calendar database for new data events comprising new calendar event being added or an existing event being moved or cancelled;
determining, via scheduling module, that the new data event indicates availability of one or more identified users for participation in the session;
querying an idea database for ideas assigned to the identified users;
polling the identified users regarding starting the session; and
starting the session with one or more of the identified users that respond to affirm starting the session.

16. A system for implementing virtual assistant-based ideation management, the system comprising:
memory that stores a challenge database, the challenge database including information regarding a plurality of challenges each providing a different prompt for a session;
a microphone that records audio data during a session, wherein the recorded audio data is in response to questions output by a virtual assistant;
one or more processors that execute instructions stored in memory, wherein execution of the instructions by the processors:
analyzes the recorded audio data to identify that the recorded audio data indicates a user selection for one of the stored challenges,
queries the challenge database to find the selected challenge and similar challenges using natural language comparison to the stored information regarding the challenges,
outputs a list via the virtual assistant, wherein the list includes the selected challenge and one or more challenges identified as similar based on the natural language comparison,
retrieves one of the challenges in the list, wherein the retrieved challenge is updated according to a creation pattern identified by application of machine learning based on an idea that is identified by further analysis of the recorded audio data; and
adds one or more challenges based on the creation pattern, wherein the challenges extend from identified ideas that were generated from previous challenges; and
a display of a user device associated with the session, the display displaying the updated challenge information with the identified idea.

17. A non-transitory, computer-readable storage medium, having embodied thereon a program executable by a processor to perform a method for ideation management, the method comprising:

storing a challenge database in memory, the challenge database including information regarding a plurality of challenges each providing a different prompt for a session;

recording audio data via a microphone during a session, wherein the recorded audio data is in response to questions output by a virtual assistant;

analyzing the recorded audio data to identify that the recorded audio data indicates a user selection for one of the stored, challenges;

querying the challenge database to find the selected challenge and similar challenges using natural language comparison to the stored information regarding the challenges;

outputting a list via the virtual assistant, wherein the list includes the selected challenge and one or more challenges identified as similar based on the natural language comparison;

retrieving one of the challenges in the list, wherein the retrieved challenge is updated according to a creation pattern identified by application of machine learning and based on an idea that is identified by further analysis of the recorded audio data;

adding one or more challenges based on the identified creation pattern, wherein the challenges extend from identified ideas that were generated from previous challenges; and displaying the updated challenge information with the identified idea on a display of a user device associated with the session.

* * * * *